US012725212B2

(12) United States Patent
Lingan et al.

(10) Patent No.: US 12,725,212 B2
(45) Date of Patent: Sep. 1, 2026

(54) METHODS AND SYSTEMS FOR PEAK POWER MANAGEMENT

(71) Applicant: Honeywell International Inc., Charlotte, NC (US)

(72) Inventors: Magesh Lingan, Bengaluru (IN); Praveen Garikapati, Vijayawada (IN); Pratiksha Sharma, Amgaon (IN); Madhav Kamath, Bengaluru (IN); Ram Prasad, Chengalpattu (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 18/970,317

(22) Filed: Dec. 5, 2024

(65) Prior Publication Data

US 2026/0120205 A1 Apr. 30, 2026

(30) Foreign Application Priority Data

Oct. 24, 2024 (IN) ............................ 202411081091

(51) Int. Cl.
*G06Q 50/06* (2024.01)

(52) U.S. Cl.
CPC .................................... *G06Q 50/06* (2013.01)

(58) Field of Classification Search
CPC ...................................................... G06Q 50/06
USPC .......................................................... 705/412
See application file for complete search history.

(56) References Cited

U.S. PATENT DOCUMENTS

| | | | |
|---|---|---|---|
| 7,607,030 | B2 | 10/2009 | Goodrum et al. |
| 8,689,020 | B2 | 4/2014 | Massey et al. |
| 8,989,911 | B2 | 3/2015 | Murai et al. |
| 9,003,216 | B2 | 4/2015 | Sankar et al. |
| 9,201,486 | B2 | 12/2015 | Jagadishprasad et al. |
| 9,275,354 | B2 | 3/2016 | Saito et al. |
| 9,577,472 | B2 | 2/2017 | Saito et al. |

(Continued)

FOREIGN PATENT DOCUMENTS

| | | | | |
|---|---|---|---|---|
| KR | 20130087672 A * | 8/2013 | ............. | G06Q 10/04 |
| WO | WO-2010118332 A1 * | 10/2010 | ............. | G05D 29/00 |

OTHER PUBLICATIONS

H. Lee, Y.-K. Jeong and I.-W. Lee, "A mechanism of ontology-based rule management for smart building energy saving service," 2012 International Conference on ICT Convergence (ICTC), Jeju, Korea (South), 2012, pp. 737-738. (Year: 2012).*

(Continued)

*Primary Examiner* — Shannon S Campbell
*Assistant Examiner* — Hunter Molnar
(74) *Attorney, Agent, or Firm* — Seager, Tufte & Wickhem, LLP

(57) ABSTRACT

Methods and systems for power load management in a facility. An initialization step includes identifying power curtailment actions that may be taken, using operator input to select usable power curtailment actions, and quantifying effects of power curtailment actions by use of models of equipment in a facility. A power curtailment step includes identifying and quantifying a need for power curtailment, selecting a subset of the usable power curtailment actions, and implementing the selected subset to reduce power usage. After a power curtailment action has been implemented, the already implemented action may be de-prioritized for a subsequent one or more iterations of the method.

18 Claims, 5 Drawing Sheets

(56) References Cited

U.S. PATENT DOCUMENTS

| | | | | |
|---|---|---|---|---|
| 10,068,263 | B2 | 9/2018 | Parikh | |
| 10,147,148 | B2 | 12/2018 | Wu et al. | |
| 10,234,926 | B2 | 3/2019 | Gatson et al. | |
| 11,216,059 | B2 | 1/2022 | Frias et al. | |
| 11,379,937 | B2 | 7/2022 | Nakagaki et al. | |
| 11,385,985 | B2 | 7/2022 | Wang et al. | |
| 12,021,385 | B2 | 6/2024 | Mcnamara et al. | |
| 2006/0142900 | A1 | 6/2006 | Rothman et al. | |
| 2009/0030557 | A1 | 1/2009 | Castelli et al. | |
| 2009/0113221 | A1 | 4/2009 | Holle et al. | |
| 2010/0088261 | A1* | 4/2010 | Montalvo | H02J 3/144 700/297 |
| 2011/0208368 | A1* | 8/2011 | Milazzo | G06Q 50/06 700/295 |
| 2013/0007498 | A1* | 1/2013 | Acosta-Cazaubon | H02J 3/14 713/340 |
| 2013/0151319 | A1 | 6/2013 | Pan | |
| 2013/0226359 | A1* | 8/2013 | Ji | F24F 11/30 700/291 |
| 2013/0345889 | A1 | 12/2013 | Osogami et al. | |
| 2014/0013125 | A1 | 1/2014 | Lynar et al. | |
| 2014/0058574 | A1 | 2/2014 | Lynar et al. | |
| 2014/0310537 | A1 | 10/2014 | Messick et al. | |
| 2014/0324535 | A1 | 10/2014 | Chen et al. | |
| 2015/0025698 | A1* | 1/2015 | Strelec | G06Q 50/06 700/291 |
| 2015/0241947 | A1 | 8/2015 | Allen-Ware et al. | |
| 2015/0268650 | A1 | 9/2015 | Patil et al. | |
| 2015/0303691 | A1 | 10/2015 | Forbes, Jr. | |
| 2015/0326016 | A1 | 11/2015 | Forbes, Jr. | |
| 2016/0118790 | A1* | 4/2016 | Imhof | H02J 3/00 700/275 |
| 2017/0031429 | A1* | 2/2017 | Miyazaki | G06Q 50/06 |
| 2019/0215181 | A1 | 7/2019 | Alvord et al. | |
| 2019/0332164 | A1 | 10/2019 | Sinha et al. | |
| 2021/0318707 | A1 | 10/2021 | Dyess et al. | |
| 2023/0187937 | A1 | 6/2023 | Mcnamara et al. | |
| 2023/0281519 | A1 | 9/2023 | Forbes, Jr. | |
| 2024/0045459 | A1 | 2/2024 | Dyess et al. | |
| 2024/0154415 | A1* | 5/2024 | Zeighami | H02J 3/003 |

OTHER PUBLICATIONS

Y. Zhao, "Using Machine Learning to Optimize Building Energy Consumption Prediction and Generate Energy-saving Strategies," 2024 International Conference on Intelligent Algorithms for Computational Intelligence Systems (IACIS), Hassan, India, Aug. 23, 2024, pp. 1-5. (Year: 2024).*

* cited by examiner

METHODS AND SYSTEMS FOR PEAK POWER MANAGEMENT

RELATED APPLICATIONS

This application claims the benefit of Indian Provisional Patent Application Number 202411081091, filed Oct. 24, 2024, which application is incorporated by reference herein.

BACKGROUND

A power forecast can be used in a facility to estimate power demand in an upcoming time period. The forecast may be performed at intervals. Power use in the facility may be monitored in parallel to the power forecasting. When a peak of power use is either predicted or identified from the monitored power use, quick reduction of power use in the facility is desirable. Such power load curtailment may prevent system overload, internal or external to the plant, and may also avoid penalties and/or reduce utility charges from a grid operator.

Prior systems for power load curtailment rely on an ordered list of actions to perform in response to measured or predicted peak power loads going above a desired threshold or boundary. This is undesirable because the actions in such an ordered list are not tailored to the needed demand reduction, resulting in mis-match that can either over-correct the power usage, or may under-correct leading to delays in adequately curtailing a power usage peak. Moreover, the use of an ordered list leads to reliance on a limited subset of the possible load curtailment actions, and can therefore inconvenience on-site personnel and/or may affect on-site productivity or other factors.

In many such systems, the actual impacts of curtailment actions are not well understood. This is because, in part, load monitoring tools (such as power meters) are generally only used on the largest equipment in the facility, and many auxiliary and non-essential systems are unmonitored. Better tools for determining or estimating the impact of curtailment actions are desired.

OVERVIEW

The present inventors have recognized, among other things, that a problem to be solved is the need for new and/or alternative methods and systems for peak power use curtailment.

A first illustrative and non-limiting example takes the form of a method for managing power usage in a facility comprising: constructing a plurality of models each associated with a power user in the facility; using at least the plurality of models, defining a plurality of power curtailment actions and estimated power reduction for each power curtailment action; presenting to an operator the plurality of power curtailment actions and estimated power reduction for each power curtailment action; receiving, from the operator, a selection of the power curtailment actions for use in peak power management; determining a power reduction is needed in the facility; identifying a subset of the selected power curtailment actions to execute to achieve the power reduction by: determining prior usage of the selected power curtailment actions and de-prioritizing use of at least one of the selected power curtailment actions based on the prior usage; determining a quantity of power reduction needed; and identifying a combination of the power curtailment actions which, based on the estimated power reduction for each power curtailment action, will provide the needed quantity of power reduction; and executing the subset of the selected power curtailment actions to reduce power used in the facility.

Additionally or alternatively, de-prioritizing includes preventing use of the at least one of the selected power curtailment actions.

Additionally or alternatively, identifying a combination of the power curtailment actions comprises applying a cost function to identify a least cost subset of curtailment actions providing the quantity of power reduction.

Additionally or alternatively, de-prioritizing comprises applying an additional cost on use of the at least one of the selected power curtailment actions based on the prior usage.

Additionally or alternatively, receiving, from the operator, a selection of the power curtailment actions for use in peak power management also includes receiving one or more indications of costs to associate with the selection of the power curtailment actions.

Additionally or alternatively, the step of determining a power reduction is needed in the facility comprises applying one of the plurality of models to estimate future power consumption at least one of the modeled power users.

Additionally or alternatively, the method also includes measuring power usage by at least one power equipment system in the facility using a power meter associated with the at least one power equipment system, identifying a power equipment curtailment action associated with the at least one power equipment system, and including the power equipment curtailment action in the selected power curtailment actions.

Additionally or alternatively, determining prior usage of the selected power curtailment actions comprises identifying a previous episode of execution of one or more power curtailment actions, and de-prioritizing is applied to all power curtailment actions used in the previous episode.

Additionally or alternatively, de-prioritizing comprises applying a weighting or cost factor to a de-prioritized power curtailment action.

Additionally or alternatively, the weighting or cost factor applied to the de-prioritized power curtailment action being a function of time which reduces effect of the weighting or cost factor as time passes since a last use of the de-prioritized power curtailment action.

Another illustrative and non-limiting example takes the form of a non-transitory, computer-readable medium including instructions that when executed by a processor cause the processor to: construct a plurality of models each associated with a power user in a facility; using at least the plurality of models, define a plurality of power curtailment actions and estimated power reduction for each power curtailment action; present to an operator, on a graphical interface, the plurality of power curtailment actions and estimated power reduction for each power curtailment action; receive, from the operator at an operator interface, a selection of the power curtailment actions for use in peak power management; determine a power reduction is needed in the facility; identify a subset of the selected power curtailment actions to execute to achieve the power reduction by: determining prior usage of the selected power curtailment actions and de-prioritizing use of at least one of the selected power curtailment actions based on the prior usage; determining a quantity of power reduction needed; and identifying a combination of the power curtailment actions which, based on the estimated power reduction for each power curtailment action, will provide the needed quantity of power reduction;

and issue commands to execute the subset of the selected power curtailment actions to reduce power used in the facility.

Additionally or alternatively, de-prioritizing includes preventing use of the at least one of the selected power curtailment actions.

Additionally or alternatively, identifying a combination of the power curtailment actions comprises applying a cost function to identify a least cost subset of curtailment actions providing the quantity of power reduction.

Additionally or alternatively, de-prioritizing comprises applying an additional cost on use of the at least one of the selected power curtailment actions based on the prior usage.

Additionally or alternatively, receiving, from the operator, a selection of the power curtailment actions for use in peak power management also includes receiving one or more indications of costs to associate with the selection of the power curtailment actions.

Additionally or alternatively, the instructions cause the processor to determine a power reduction is needed in the facility by applying one of the plurality of models to estimate future power consumption at least one of the modeled power users.

Additionally or alternatively, the instructions also cause the processor to measure power usage by at least one power equipment system in the facility using a power meter associated with the at least one power equipment system, identify a power equipment curtailment action associated with the at least one power equipment system, and include the power equipment curtailment action in the selected power curtailment actions.

Additionally or alternatively, determining prior usage of the selected power curtailment actions comprises identifying a previous episode of execution of one or more power curtailment actions, and de-prioritizing is applied to all power curtailment actions used in the previous episode.

Additionally or alternatively, de-prioritizing comprises applying a weighting or cost factor to a de-prioritized power curtailment action.

Another illustrative and non-limiting example takes the form of a system comprising a processor in a facility, a graphical interface associated with the processor, and an operator interface associated with the processor, the processor coupled to one or more communications lines or devices in the facility to provide commands to and obtain data from one or more power users in the facility, wherein the processor is configured to: construct a plurality of models each associated with a power user in a facility; using at least the plurality of models, define a plurality of power curtailment actions and estimated power reduction for each power curtailment action; present to an operator, on a graphical interface, the plurality of power curtailment actions and estimated power reduction for each power curtailment action; receive, from the operator at an operator interface, a selection of the power curtailment actions for use in peak power management; determine a power reduction is needed in the facility; identify a subset of the selected power curtailment actions to execute to achieve the power reduction by: determining prior usage of the selected power curtailment actions and de-prioritizing use of at least one of the selected power curtailment actions based on the prior usage; determining a quantity of power reduction needed; and identifying a combination of the power curtailment actions which, based on the estimated power reduction for each power curtailment action, will provide the needed quantity of power reduction; and issue commands to execute the subset of the selected power curtailment actions to reduce power used in the facility.

This overview is intended to introduce the subject matter of the present patent application. It is not intended to provide an exclusive or exhaustive explanation. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
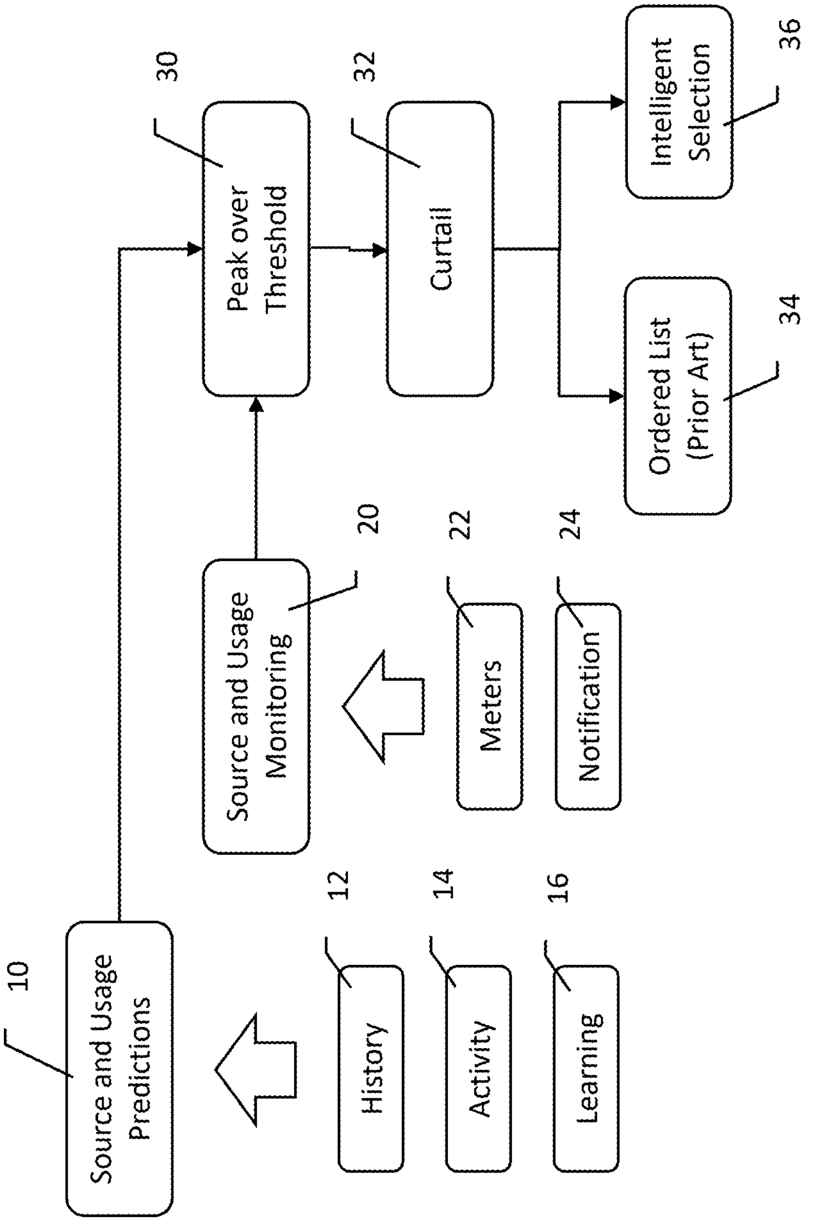
FIG. 1 illustrates a peak power management method.

A peak power management system is proposed in which the power usage of a wide range of the power users in a facility is estimated or modeled using design documentation of such systems. This may include lighting, heating, ventilation and air conditioning, and other comfort-related systems, on-site electric vehicle charging systems, and other power users. With these models available, a plurality of load curtailment actions are identified, and the effects of such load curtailment actions are estimated. A single power user may be modeled multiple times to identify a plurality of load curtailment actions for that one power user, in some examples.

An operator is presented with the opportunity to select and/or de-select load curtailment actions that will be made available to the peak power management system, yielding a selected set of load curtailment actions which the peak power management system can use. Such presentation may take place using a graphical interface, such as a screen or display, touchscreen, television, monitor, etc. The selection may be made on the screen or via an operator interface such as a keyboard, mouse, voice command, or any other suitable device or system for receiving operator input.

The models further inform the system by indicating the quantity of power curtailment to be anticipated from each power curtailment action. The terminology herein treats personnel making determinations as “operator(s)”, and the equipment that consumes power at a facility as “user(s)”.

In operation, the peak power management system identifies a need to reduce power usage. This may include reliance on power forecasting and/or power consumption monitoring, or both. When a reduction in power use is needed, the peak power management system first determines which of the selected set of load curtailment actions have been used in previous episodes of load curtailment. Those actions which have been previously used are de-prioritized and/or excluded, at least initially, from re-use. Next, knowing an amount of load curtailment that is needed (based on comparison of the forecast or measured power use to a threshold, for example), the remaining set of load curtailment actions is analyzed, and a subset of load curtailment actions are selected, using the modelled effects of such actions, so that the expected load curtailment matches the requested amount of load curtailment. Models used in estimating the load curtailment may also be re-used in the power forecasting method.

Commercial electricity customers are typically billed consumption charges as well as demand charges. Consumption charges are for the volume of electricity consumed and are often measured in kilowatt-hours (kWh). Consumption charges are often referred to as energy charges, and typically applicable to residential customers as well. Demand charges, which are typically not applied to residential bills, are billed for the highest level of electricity demand ("peak demand") of a customer during a billing period, often measured in kilowatts (KW). The peak demand is typically defined as the highest average electricity usage occurring within a defined time interval (e.g. 15 minutes) during the billing period. For many commercial customers, demand charges can account for 30-70 percent of the total charges on a monthly electric bill. Because peak demand is based on how and when a customer uses electricity, two customers that consume similar amounts of overall electricity can incur very different demand charge expenses depending on their peak demand during the billing period.

FIG. 1 illustrates a peak power management method. At block 10, the system generates power source and/or power user predictions. A power source may be any on-site source of power, such as renewable, replenishable, and/or non-renewable, as desired.

Some examples may be operable at facilities lacking on-site power sources. In some examples, power sources on-site may be scalable or variable in terms of usage, production, etc. as, for example, a natural gas generator (a non-renewable on-site power source) can be turned off or set on at one or more power levels to provide increasing levels of output electricity.

A replenishable source may be a rechargeable grid-scale battery station, mechanical (gravity-based or flywheel, for example) power storage, fluid or liquid storage (again, often gravity based), pneumatic, thermal or chemical power storage systems. Renewable sources may include solar, thermal, hydroelectric, or any other renewable power supply. Predictions related to renewable sources may include predictions for sunrise/sunset, weather (wind, cloud coverage, precipitation, temperature) or other factors as may apply to any given installation or source. For prediction purposes, a power source also includes grid power, wherein predictions related to grid power may encompass predictions of availability and/or pricing metrics related to grid power.

A power user may be any on-site system or device that consumes power, in particular, electricity. Power users may include heating, ventilation, and air conditioning systems, lighting systems, factory or industrial installation systems, manufacturing lines, boilers, welding and other apparatuses, refrigeration systems, robotics, computing systems including for example, servers and other processing or memory systems, elevators, escalators, plug loads, fans and the like. Some facilities may include on-site as electrical vehicle charging systems.

Some of these power users may be considered higher and/or lower priority users of electricity at a particular facility. For example, on-site computing systems that store critical data for operating systems in the facility may be the highest priority systems, with manufacturing lines as well as refrigeration or other environmental control systems that are used to preserve critical or high value resources (for example, a cooling system for a room that holds pharmaceutical products or biologics which can be damaged or rendered non-marketable if not held at desired temperatures) also considered high priority. Other systems may be lower priority including electrical vehicle charging systems, some lighting systems, and heating, ventilation and air conditioning systems relied upon for comfort.

The predictions at 10 may rely on historical information 12, ongoing or planned activity 14, and/or a learning utility 16, such as an artificial intelligence or machine learning tool, neural network, etc. Inputs may also include external data sources such as weather predictions. In some instances, energy consumption may be predicted using any combination of various models including, for example, linear regression, regressive integrated moving average models, using historical and or external inputs. Data points fed to the model(s) may include kW history data (e.g. from facility wide electrical meters, equipment specific electric meters, etc.) weather parameters (humidity, dewpoint, temperature) and equipment and working time schedules. Short and/or long-term predictions and models may be used, separately or combined together, as desired. Predictions 10 may rely on machine learning and/or artificial intelligence, neural networks or any other suitable underlying technology and/or tools.

In some instances, occupancy predictions of the facility may be fed as an input to the prediction 10, which may also help improve the accuracy of the predicted power consumption of the facility. As an example, more people in a space may mean more people operating electrical equipment and/or may place additional demands on heating, ventilation and air conditioning equipment. Equipment operation and/or operating parameters may be correlated with power consumption of the equipment. Operation schedules for equipment may be provided as an input to the models to help improve the accuracy of the predicted power consumption of the facility. Being able to identify particular equipment that contributes to consumption peaks is useful to identify appropriate action to take to reduce peak consumption during a billing period to reduce or eliminate some or all of the utility demand charges. In some cases, an Artificial Intelligence and/or Machine Learning algorithm may be trained to predict the power consumption of the facility into the future, and when the predicted power consumption is expected to invoke one or more utility demand charges, illustrative examples herein curtail one or more identified loads of the facility in order to avoid or at least minimize the utility demand charges before they occur.

In some cases, the Artificial Intelligence and/or Machine Learning algorithm may be a self-learning algorithm that continuously learns. In some instances, self-learning may contribute to being able to automatically identify appropriate equipment to achieve kW reductions, and when to ramp up and ramp down the equipment operations in order to lower electrical consumption peaks and reduce exposure to demand charges and other possible tariffs charged by the electrical utility. In some instances, recovery actions (e.g. actions restoring the curtailed equipment back to the pre-curtailed state) may take building space convenience such as comfort into account. For example, if building conditions have changed during the curtailment, the Artificial Intelligence and/or Machine Learning algorithm may determine that recovery is not needed to maintain building space convenience (e.g. comfort), and thus may eliminate the recovery actions to reduce utility demand. In some cases, the Artificial Intelligence and/or Machine Learning algorithm may determine that a partial recovery is warranted (e.g. not recover all the way to the pre-curtailed state), and may implement a partial recovery. These are just examples.

The system also performs source and/or usage monitoring 20, to the extent available. This can include meters 22 and/or notifications 24. For example meters 22 may include an overall usage monitor provided at the interface with a building main meter, tracking usage of the utility power-in line. Some equipment inside the facility may be monitored for power usage as well. This may include items that use large amounts of power on site. There may also be smaller meters, such as smart plugs which can be plugged into wall outlets and track usage. However, usage meters are unlikely to cover all the equipment in a given facility. Usage notifications can also include notifications 24 from a utility, for example.

Notifications 24 may include the utility indicating to a facility a request, requirement or tariff applicable to power usage by the facility, such as an indication of peak power usage on the grid and a requirement for reduced power usage at the facility. For example, notifications 24 may include information for a facility regarding peak power usage fees.

Likewise, power sources may be monitored at 20, including meters 22 and/or notifications 24. Meters 22 may be used for example with any of solar power, hydropower, wind power, or other systems that generate renewable power, as well as any of an on-site generator (such as a diesel or natural gas generator). Notifications 24 may come from any of these as well, for example, a wind power system may require shut-down of a turbine in response to excessively windy conditions. In such a case, the notification would provide the peak power management system with notice of a near-future reduction in power from that source.

At block 30, the peak power use, whether predicted or monitored, is compared to one or more thresholds. If a threshold is exceeded, the system then curtails 32 the power usage. In prior art installations, curtailment is performed according to an ordered list 34 of power curtailment actions.

The use of an ordered list may cause a particular curtailment action to be used frequently, without other possible curtailments being used. Moreover, because individual actions taken to curtail power use may have varying impacts, the use of an ordered list means that the amount of power use curtailment may not match that which is needed to ensure that usage remains below an applicable threshold. For example, if the ordered list of power curtailment actions includes actions having impacts of 15 kW, 10 KW, and 20 kW, in that order, a request for curtailment of 30 kW would not be met by the first two steps (15 kW reduction, then 10 KW reduction, giving only 25 kW reduction). As a result, all three steps would be called, yielding 45 kW of power reduction. In this very simple scenario, one of the first two actions (and associated inconvenience or sub-optimal facility operation or productivity) could be avoided.

The issue of ordered list mismatch to needed curtailment becomes a larger problem when in context of utility demand pricing. Charging for electricity may use a formula as shown here:

$$\text{Bill}(\$) = D1(\text{kWh}) * \text{Tariff}[0](\$/\text{kWh}) + D2(\text{kWh}) * \text{Tariff}[1](\$/\text{kWh})$$

Where D2 represents power consumption above a peak demand during a billing period. The power consumption receives a higher tariff, namely tariff[1]. The general idea is to lower the highest power consumption peak, in order to avoid higher tariffs, as well as generally reduce the total energy used represented by the area under the curve (and D1 in the above equation). The result is that if the power curtailment actions overcorrect, the benefit in terms of avoiding tariff[1] type charges in the above formula simply does not apply. Finally, it is often the case that actions taken to curtail power use simply delay when power will be needed. For example, shutting down a heating, ventilation and air conditioning system for a period of time allows temperature in the facility to rise above a setpoint (on a hot day) or drop below a setpoint (on a cold day). Once the curtailment need ceases to exist, the heating, ventilation and air conditioning system is reengaged and will operate for a potentially extended period of time to return the temperature in the facility to the desired setpoint. If, instead, a power curtailment action is to turn down or cease use of a production machine in a production facility, for example, locking out a welding station until peak power issues are no longer applying, the needed activity (welding) will simply have to be performed later. Thus, total power usage in the facility may not change, and so long as the peak power consumption represented by D2*Tariff[1] in the above formula can be minimized, no benefit is achieved by virtue of exceeding the required curtailment.

In some illustrative examples, some actions may be poorly understood or lack an accurate estimation (or any estimation) of impact. For example, a common first step in power curtailment may include turning off a number of lights. However, the power management system usually has no or very limited ability to estimate the effect of that step and, particularly with transitions away from incandescent light bulbs to lower power LED devices, the actual effect on power consumption of the lights going off has been reduced, while the inconvenience it may cause may still be high. Shutting down or lowering the speed of a fan may also be poorly understood in many facilities.

In illustrative examples herein, rather than an ordered list of actions, an intelligent selection 36 is performed as further discussed below to address these issues with the ordered list 34. In some examples, the intelligent selection at 36 analyzes the individual potential mitigations or curtailments to be taken using available information that goes beyond merely monitoring power at select, large power users with a power meter. The intelligent selection 36 may rely on models built using design documentation of even smaller power users on-site. Intelligent selection 36 may be further augmented, optionally, by use of additional tailored models informed by historical data 12, to the extent that power load as a total quantity at a site can be monitored as changes to power user settings are made within the facility.

The intelligent selection 36 is also tailored to identify and de-prioritize selection of one or more curtailment actions based on history of use of such curtailment actions. Thus if, for example, a particular area of the facility has been subject of reduced heating, ventilation and air conditioning support due to selection of reduced heating, ventilation and air conditioning usage for that area of the facility in prior iterations of the method, the intelligent selection 36 considers such prior usage and will prioritize selecting other curtailment actions. This distributes the burden and/or inconvenience of power curtailment more equally across a given facility.

An intelligent selection 36 may also consider matching the desired degree of power curtailment to available curtailment actions. Using the above example of the ordered list of actions having 15 KW, 10 KW, and 20 KW effects, and a 30 kW request for curtailment, in a first iteration, the 10 kW and 20 KW steps may be selected for implementation to provide 30 kW of power reduction, bypassing the 15 kW step. In a subsequent iteration, however, the 10 KW and 20 kW action have already been used. The 15 KW and 10 KW steps, if used together, would be insufficient to provide the desired curtailment in the subsequent iteration, and so, instead, to provide the requested curtailment, the 15 KW and 20 KW steps would be chosen, providing a relatively close match to the desired curtailment without reusing the same curtailment steps as previously executed.

The intelligent selection 36 may be configured to apply different weighting factors or penalties to different solutions using one or more different weighting factors and/or penalties, such as for prior usage, under-curtailment, over-curtailment, life-cost and/or operator preferences, etc. Thus, for example, an intelligent selection may seek to minimize a cost function within selected parameters, as further detailed below.

Using the above note regarding power curtailment actions that merely delay power usage, the intelligent selection may be configured to apply greater or lesser penalties depending on the actual total power benefit of changes. For example, turning of lights is inconvenient to occupants of the building, but would affect both D1 and D2 in the above recited billing formula. Thus in a cost-minimization approach to optimizing the intelligent selection, a penalty for a curtailment action of turning off lights may be less than a penalty for curtailment actions that merely delay power usage, such as a power curtailment action that delays use of a piece of production equipment.

Figure 2:
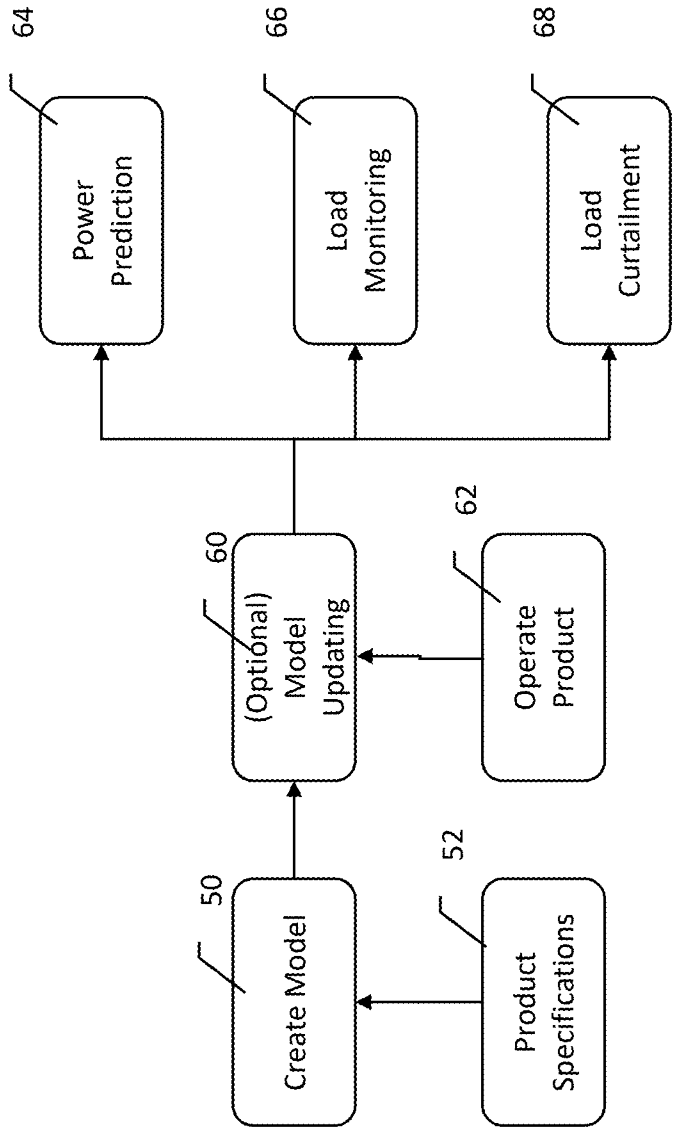
FIG. 2 shows in block form a method of building power use models.

FIG. 2 shows in block form a method of building power use models. Each model is developed in this example as shown at 50, using product specifications 52 for the piece of equipment. The model will be used to estimate power usage based on the settings of the equipment. For example, a fan, compressor or other device may be operable at one or more settings (on/off, off/low/high, a range of 0 to 10, etc.) The product specifications will provide, for example, current draw for each such setting. Taking the current draw for each setting, and the power source requirements (for example, 120 Volts, 220 Volts, 480 Volts, etc.), power load for each setting can be obtained and used to create the model at 50. If desired, optionally, model updating 60 can be performed at 60 by actually operating 62 one or more pieces of equipment while monitoring power use such as with a meter.

In some examples, power mains metering can be used to create estimates of power usage with each of the sources. For example, if total power input is known, and some users are monitored, the remaining unknown users on site may be estimated over time by monitoring the power mains meter while tracking these unknown users. However, to build any reasonably accurate model over time may be quite difficult without the ability to reduce the list of unknown power user loads. The inclusion of initial models as described herein may advance such a process.

In some examples, the model building herein is used without attempting to create a more sophisticated or complete model of power usage on site using a power mains meter as an input. In alternative examples, a complete model for the facility may be constructed over time using piece-by-piece modeling of power users derived from the documentation available with each piece of equipment. Custom equipment, however, may require additional efforts to construct models that are otherwise readily build from design documentation for commercial, off-the-shelf equipment.

In an illustrative example, these models are generated for at least some, or most, or even all of the power users in a given facility. Power users may anything in a facility that uses the electrical power supplied throughout the facility, including motors, lights, office equipment, industrial equipment, heating, ventilation and air conditioning equipment, elevators, escalators, etc. Some examples will be operable on a building management system (BMS) which may already have an inventory of the power users in the system, and so additional data can be obtained from or within the BMS to build each such model.

The models are then passed on for use in one or more of the peak power control functions show on the right. In power prediction 64, these models can be used to estimate or predict power usage in a near term (a period or prediction horizon of, for example, 1 to 60 minutes, more commonly any of 10, 15, or 20 minutes) using current settings for the equipment, and any anticipated changes to such settings in the prediction horizon. The power prediction 64 may be used, as noted above, for purposes of anticipating power usage in order to avoid or limit peak power demand time periods that can significantly increase utility pricing. Load monitoring 66 may also incorporate such models. For example, actual usage monitored with current/power meters on at least some equipment can be added to model-based estimates for non-monitored equipment. This may be helpful as well to allow non-modeled and/or non-metered systemic power usage to be better understood. For example, with more of the underlying system modeled in this way, the ability to analyze usage and identify power losses in the system due to, for example, equipment malfunction can be aided.

The models are also used, as illustrated further below, in load curtailment 68. More particularly, as described below, load curtailment 68 can include identifying actions to be taken to reduce power utilization, thereby ensuring stability of power supply as well as reducing excess power charges (tariffs) applicable to peak power demand. With more of the systems in the facility modeled, there is greater opportunity to identify and more precisely respond to peak power demand periods without unduly affecting facility operations, occupant comfort, etc.

The methods and models can be implemented and/or stored on one or more controllers in the system. The controller may take many forms, including, for example, a microcontroller or microprocessor, coupled to a memory storing readable instructions for performing methods as described herein, as well as providing configuration of the controller for the various examples that follow. The controller may include one more application-specific integrated circuits (ASIC) to provide additional or specialized functionality, such as, without limitation a signal processing ASIC that can filter received signals from one or more sensors using digital filtering techniques. Logic circuitry, state machines, and discrete or integrated circuit components may be included as well. The skilled person will recognize many different hardware implementations are available for a controller. A controller as described may be included in a computer and/or server, for example. When implemented in software or firmware, various elements of the systems described herein are essentially the code segments or instructions that perform the various tasks. The program or code segments can be stored in a computer-readable, processor-readable and/or machine readable medium. The "computer-readable medium", "processor-readable medium", or "machine-readable medium" may include any medium that can store or transfer information, including without limitation, an electronic circuit, a semiconductor memory device, a read-only memory (ROM), a flash memory, an erasable ROM (EROM), a floppy diskette, a compact disk, an optical disk, a hard disk, or the like.

A controller or processor may, for example, include or be associated with an operator interface for receiving inputs, selections, and commands from an operator, and a graphical interface for displaying one or more of data, choices, queries, operating actions or any other desired outputs to an operator. A processor or controller may also be coupled to communications lines in a facility, such as one or more bus, an Ethernet, or any other wired, fiber optic, or other physical communications line in the facility, as well as wireless communications resources including Bluetooth, WiFi routers, cellular transceivers, or any other communications device, wired or wireless, in a facility, which in turn is coupled to power users and/or power sources in the facility. These communications connections (lines, wired, or wireless) are then used by the controller or processor to receive data and/or issue commands to the power users and power sources in the facility, as detailed below.

Figure 3:
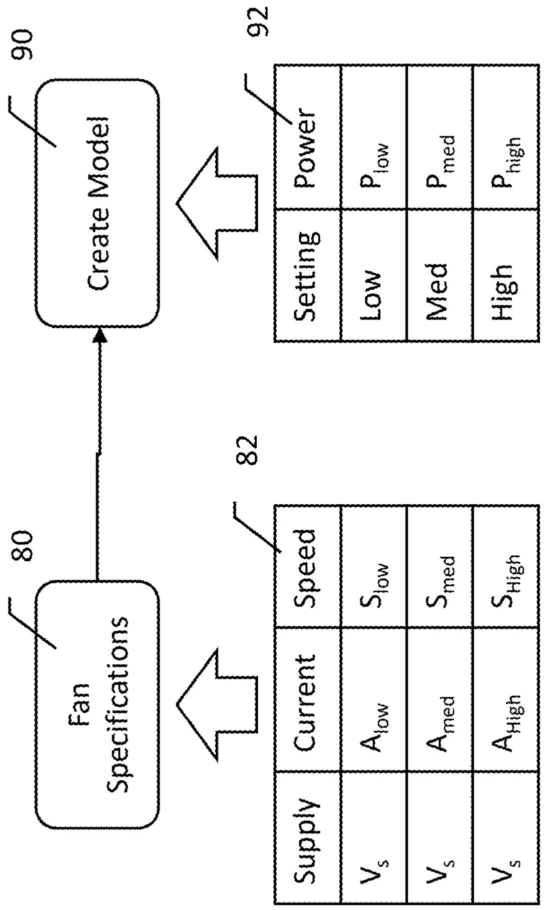
FIG. 3 illustrates an example implementation of FIG. 2.

FIG. 3 illustrates an example implementation of FIG. 2. Using, as an example, a fan, the specifications for the device, shown at 82, may include a power supply voltage, current draw, and speed setting. These are combined together to create a model at 90, where the setting applied to the fan is matched with modeled power draw for the device, as indicated at 92. While a fan is noted other components such as compressors, boilers, heating, ventilation and air conditioning systems, pumps, lighting, manufacturing lines, computing systems, etc. may be modeled in a similar way. Some modelling will include gradient input settings, rather than stepwise settings, for example, a variable speed fan may have more than just off, low, medium and high settings, and may have a more or less continuously variable speed setting; the model may account for this by having multiple setpoint levels for the fan (a set of discrete settings and associated power levels), or by using a more sophisticate model in which power is a function of selected speed or any other factor used to control the fan. Pumps, boilers and other systems may be likewise continuously variable.

Figure 4:
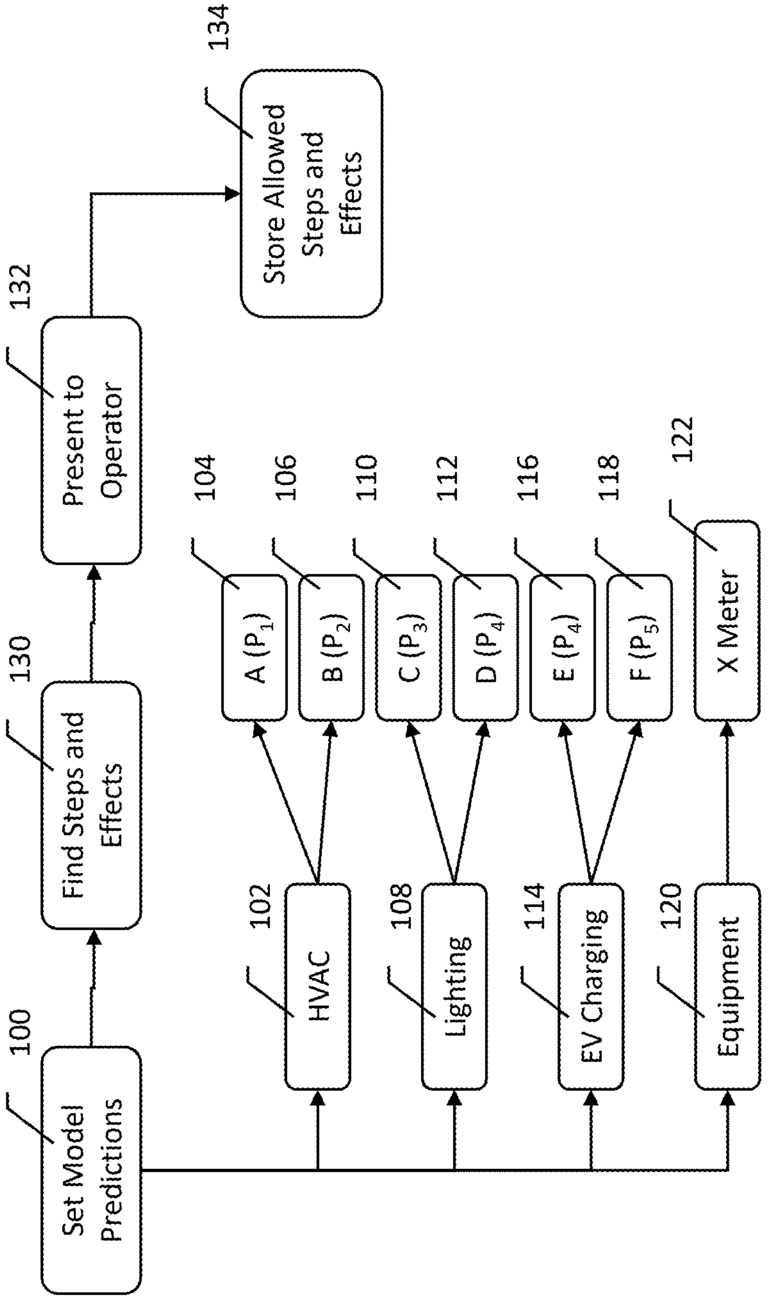
FIG. 4 shows an illustrative peak power management method in block form.

FIG. 4 shows an illustrative peak power management method in block form. Models similar to those of FIG. 3 may be used throughout the method. At 100, the plurality of models are used to generate model predictions. Thus, for example, systems are identified as groups as indicated below.

In an example, the heating, ventilation and air conditioning (HVAC) system 102 is considered. A plurality of power curtailment actions for the HVAC system 102 are then identified, as indicated at 104, 106. Effects of each of the power curtailment actions can be derived from modeled and/or monitored/measured behavior. That is, for example, in an HVAC system, the power drawn by one or more fans may be based on models, while the power drawn at a compressor (which may be a larger power user than the fans) may be obtained either from a model and/or from a meter.

The effect of a power curtailment action may be measured and/or reported in terms of watts, amperes, or any other suitable unit. The actual effect may be determined from the step proposed by subtracting the power level after taking the proposed step from the power level prior to taking the proposed step. Thus, for example, if a piece of equipment at a first, pre-curtailment setting operates using 3700 Watts of power, and is reduced to 2500 Watts of power, the action has an effect of reducing power by 1200 Watts. Actions may include multiple steps for a given piece of equipment, such as determining power changes for a pump at each of a range of pump settings to each of a range of lower settings. Each piece of equipment may have numerous actions defined in the model as created at 50.

The power curtailment actions are identified, and may include combinations of actions affecting multiple pieces of equipment within a given system/subsystem, and/or may include individual actions affecting single pieces of equipment. For example, with an heating, ventilation and air conditioning system, a single equipment action may be reducing the speed or power setting on a compressor, while a combined equipment action may include both reducing the speed or power setting of a compressor and modifying a speed setting on a fan. The system may consider a range of such actions.

Each of the power curtailment actions and their effects may be grouped, for example, with one or more actions/effects at 104, 106 for the heating, ventilation and air conditioning system. The lighting system 108 may be considered with one or more actions/effects 110, 112. If present at a facility, electric vehicle (EV) charging systems 114 may be considered, with one or more actions/effects 116, 118 considered. Other equipment may be considered as well. Some equipment use may be monitored, as indicated at 122 using for example a meter.

Actions can include any step or setting change that can affect power use. For example, heating, ventilation and air conditioning settings changes may include fan, heating system, boiler, resistive heating, compressor, heat pump, or other settings and/or changes. In some examples, due to the short-term response desired in power curtailment, changing a setpoint (such as changing a thermostat setting) may not necessarily be included, as setpoints may not provide a desired immediate response. Other examples may adjust setpoints, as stand-alone actions or in combination with other actions. The use of a setpoint control setting may not directly translated well to the models described above as, for example, the thermostat setpoint for an air conditioning system does not directly translate to a quantity of power change for that system. Thus, settings directed tot equipment itself, rather than a parameter the equipment controls, may be used in some examples.

The effects of proposed or possible power curtailment actions are determined by using model-based data and/or historical and/or meter data to determine a power level before making a setting change, and power level after making the change. Thus, the effect of turning a fan from a high setting to a low setting may be considered as one change by subtracting modeled power consumption at the low setting from the modeled power consumption at the high setting.

The system may apply various logical tests to the actions which are considered, to avoid presenting the system operator with a confusing or overlarge set of options. For example, with the lighting system 108, there may be a large range of options that can be managed, including turning off any quantity of lights. Thus, an option to turn off lights may be associated with one or more ranges of effects. A granular approach is available with such as system. In some examples, optionally, a system such as a lighting system may be treated as providing a gradient or range of available solutions, rather than one or two pre-sets, for reduced power usage in the lighting system. On the other hand, the heating, ventilation and air conditioning system has fewer available components and the number of potential options is much reduced. An applicable logic may, for example, eliminate changes having minimal effects on total power consumption, such as by only considering changes that meet at least a threshold minimum effect.

In some examples, overlap or mutual exclusivity and/or required pairings of actions may be considered, and rules set. Expert inputs and/or design documentation may be used to define mutually exclusive and/or required parings.

Overlap or mutual exclusivity may mean that power curtailment benefits for two actions do not directly sum together. For example, if one lighting action 110 is to turn off office lights, and the other 112 is to both turn off office lights and to minimize hallway lighting, these two actions cannot both be taken with like effect as they overlap. Identification of mutually exclusive actions may be performed in order to better present the operator with options.

Required pairings mean that, for example, the taking of one action requires taking another, second action and/or is contingent on the presence of a condition or setting in another device. For example, in a heating, ventilation and air conditioning system, allowing an air circulation fan to run too slowly with the compressor at a relatively high setting may create potential hazards in the system, as the compressor may over-cool a circulating fluid in the absence of sufficient air circulation of a cooling coil, leading to freezing, or frost-up, for example. A power curtailment action of turning down a fan setting in the heating, ventilation and air conditioning system may be limited by the compressor speed of a heat pump or air conditioner. Thus, some potential actions may not be made available standing alone and/or without certain contingencies met.

The model predictions 100 are thus used as indicated at 130 to finds steps and effects. The operator is then presented, at block 132, with options for the steps and effects. Such a presentation of options may take into account rule settings for mutual exclusivity and/or required pairings as noted above.

Further, the presentation of options may be system specific. For example, with a lighting system 108, the minimum required lighting in the facility may be identified, and the operator may simply indicate the minimum required lighting for one or more tiers of reduced utilization of the lighting system 108.

Optionally weighting factors and/or penalties may be presented to the operator as well, to allow the operator to indicate favored or disfavored actions. For example, the operator may be provided an option to select a top priority amongst the various systems that may be affected, and/or to elevate certain actions as preferred or favored power curtailment actions.

Presentation of options may include the use of a user interface and applicable filters. For example, the user may be allowed to filter available options by one or more of:

- Effect in terms of absolute effect on power use, or percentage of average, peak or other power use metric
- System type (production, HVAC, comfort, auxiliary, electric vehicle charging, additional power available, etc.)
- Known ripple effects or criticality Other filters may be available. Known ripple effects or criticality may relate to systems of various types. For example, a ripple effect of turning down a boiler temperature setpoint as a power curtailment action may be quite large, as this may take other equipment in the facility off-line if the boiler output is required. Likewise with a boiler, the amount of time required to return to an original setting may be considered a large ripple effect. In a server farm, for example, criticality may relate to settings of cooling systems, where it is understood that reducing the power delivered to a cooling system will allow server core temperatures to rise, potentially placing systems at risk of overheating or requiring sudden shut-down of a server in response to crossing a temperature threshold. Hard boundaries may be applied to such a system.

The presentation to the operator at block 132 may also include details regarding the effect of power curtailment actions, so that the operator can pick and choose which actions to allow or disallow while understanding how such choices affect system flexibility. The allowed steps and effects are then stored, as indicated at 134.

In an illustrative example, a cost function minimization is performed. Various factors can be used, such as prior usage, under-curtailment, over-curtailment, life-cost and/or operator preferences. For example, a set of control actions, SET, can be analyzed by calculating a cost as shown here:

$$\mathrm{Cost}(u_{j\in SET}) = \sum_{\forall j\in SET} P_{pu,j} + \sum_{\forall j\in SET} P_{op,j} + \sum_{\forall j\in SET} P_{lc,j} + w_{oc} * (\Delta_P - \Delta_R)$$

Where the notation of $j\in$ SET indicates which curtailment actions are under analysis, chosen from the overall set of available curtailment actions selected by the operator, among a total of i power curtailment actions which can be selected. Each has an applicable penalty for prior use ($P_{pu}$). A prior use penalty may be a simple step penalty, having essentially binary values; alternatively, a prior use penalty may implement a receding horizon approach, varying with the time or with the number of power curtailment procedures performed since the last prior usage of that particular curtailment action. Power curtailment actions may also be considered in groups; for example, if a previous power curtailment action turned a compressor setting from High to Medium, the penalty for prior usage may apply to all actions involving changing a setting for that compressor, whether from High to Low or Off, as well as the specific action previously taken. Thus a penalty may apply to actions that are related to or similar to previously taken curtailment actions, if desired.

When using history to determine which possible curtailment actions are available, some examples may simply block or penalize reuse of the same power curtailment action as previously used. In other examples, any block or penalty can be applied to power curtailment actions affecting the same equipment or system as was previously affected by a power curtailment action. Thus, in some examples, the system is intelligent enough to recognize that reducing fan speed from high to medium affects and then from medium to low are not two separate power curtailment actions from the perspective of the system being affected. That is the system, when preventing or discouraging reuse of a previously used power curtailment action, will treat each action affecting a given piece of equipment as similar or same actions.

Some examples may, if desired, prevent re-use of a previously taken power curtailment action entirely for at least one iteration of subsequent power curtailment, or for a period of time, if desired. Thus, rather than a receding penalty, absolute prevention of reuse of a power curtailment action may be used. In still other examples, an initial period or iteration of preventing reuse of a power curtailment action may be followed by a period or quantity of iterations (receding or not) in which a penalty is applied using the above formula.

Further, operator preference penalties ($P_{op}$) can be set for each of the curtailment actions, so that the operator can prioritize or de-prioritize any of the power curtailment actions. It should be noted as well that the operator may not select a possible power curtailment action at all when executing the method of FIG. 4, above. Optionally, to the extent a power curtailment action has a cost that may reduce the lifetime of a component (such as opening or closing a valve, adjusting a setting, turning a compressor on or off, etc.), this cost can be accounted for with a penalty ($P_{lc}$), as shown.

In some examples, a set of control actions to consider may include not just curtailment but also the operation of a replenishable power source or non-renewable power source on site, such as activating a mechanical, chemical or other system that provides replenishable or non-replenishable on-site power. These steps may carry a life cost and/or other costs, such as fuel costs for a generator, costs for replenishment of a replenishable power source, and/or externalities which may be applied as desired.

In the above formula, an overcorrection penalty or cost has a weight, $w_{oc}$ for over-curtailment, which is multiplied by the modeled or projected power curtailment (which here would be a sum of the changes for each of the j actions considered for the set) less the requested amount of over-curtailment. The overcorrection penalty may be omitted in some examples. Some examples may use combinational analysis to only identify combinations of actions that limit overcorrection. For example, valid SETs of power curtailment actions may be defined by the system to only include sets of actions if the over-correction that the SET would generate does not exceed the effect of any one of the actions. In an example, supposing 100 KW of power reduction is needed, and a proposed combination of four power curtailment actions provides, respectively, 40 kW, 15 KW, 30 KW, and 35 KW of power reduction, thus adding up to 120 kW power reduction. In the example, such as set would not be validly considered, since the 15 KW action is superfluous, and the other three actions yielding 105 kW power reduction would be sufficient. On the other hand, such a set of actions may still be considered valid if, for example, one of the larger effect actions requires the lesser action.

The above equation may apply with a constraint that the projected change in power must exceed the requested change. That is, solutions defining a set of control actions for which a cost is calculated may be limited to those that will meet the requested power curtailment. Once at least two potential power curtailment actions are identified, the cost minimization approach can then select the least cost combination of power curtailment actions, which may include selecting only a single power curtailment action. The requested power curtailment may be based on an estimated or modelled reduction in power usage at the facility to that would bring power use below an applicable threshold. The applicable threshold may be based on any suitable factor, including grid stability, fixed maximum power, power levels that avoid surcharges by the grid operator, etc. Most often, the applicable threshold will be the peak demand threshold for the facility, which can be set by the grid operator as desired.

The present invention does not necessarily require all such factors, and other or different factors can be included. Other approaches to the formula and analysis may be used, as desired.

In an industrial context, there may be still further steps that can be taken to consider costs of select actions. For example, if a tank is used to store products for use in an industrial process, a pump for the tank may be operated to maintain the tank at a desired fill level, or within desired fill boundaries. The cost of delaying usage for the pump may take into account the cost of allowing the tank fill level to drop below a desired minimum (there may be, for example, an absolute minimum and a target fill minimum, in which the absolute minimum is not to be crossed, but the target fill can be), such as by adjusting the cost of not operating the pump upward as the tank fill level drops. In this example, non-operation of the pump is an example as well of the type of action that merely delays power usage at the facility, rather than actually reducing total power consumption in the context of a full day, week, month, etc.

Some examples may therefore use different cost variables depending on the equipment that would be affected by a particular power curtailment action. Further modelling, including procedures such as model predictive control (MPC) can be used as desired to predict future usage and/or state of a particular system in the facility to predict if and/or when power utilization will be required.

Figure 5:
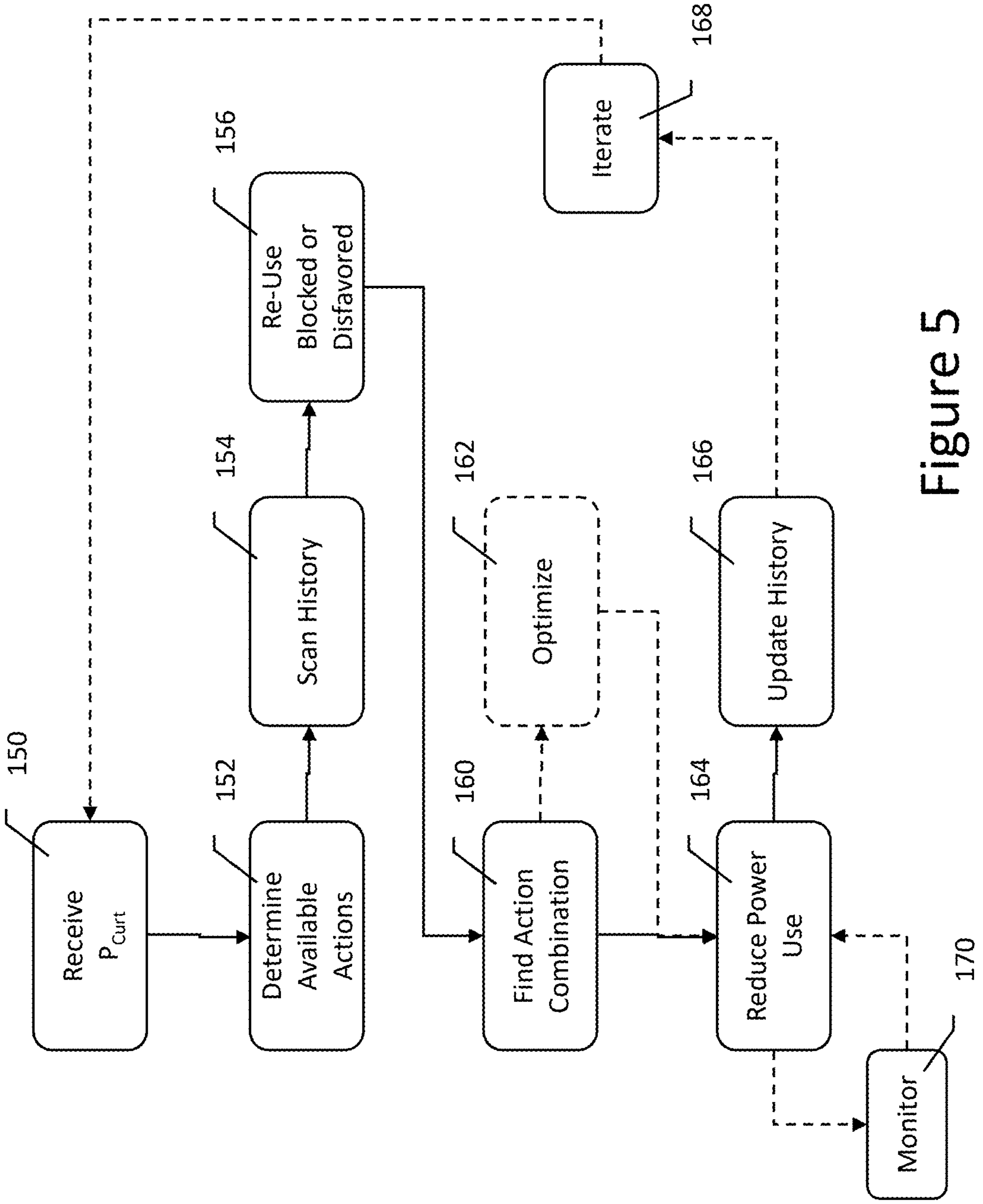
FIG. 5 shows another illustrative peak power management method in block form.

FIG. 5 shows another illustrative peak power management method in block form. Here, at block 150, a requested power curtailment is received. The requested power curtailment may be based on an estimated or modelled reduction in power usage at the facility to that would bring power use below an applicable threshold. The applicable threshold may be based on any suitable factor, including grid stability, fixed maximum power, power levels that avoid surcharges by the grid operator, etc.

Available actions are then determined at block 152. Available actions can be determined using each of the current system state and operator preferences. The current system state will define available actions as those actions starting from the current state. For example, a compressor model may estimate power consumption for the compressor at each of high, medium, and low power settings, thus power curtailment actions for the compressor may include:

| Pre-Curtailment | Post-Curtailment | Change in Power |
|---|---|---|
| High | Off | 1.2 kW |
| High | Low | 800 W |
| High | Medium | 400 W |
| Medium | Off | 800 W |
| Medium | Low | 400 W |
| Low | Off | 400 W |

If the previous state of the fan is "Medium", then only the changes starting from the medium state would be considered available actions. For example, if the pre-curtailment state of the fan is "Medium," those actions (and effects thereof) based on a pre-curtailment state of the fan as "High" would not be available. The change in power reflected in the graph is also the effect of each of the curtailment actions, even if not all area available at a given point in time.

Combination effects may be tracked as well. Continuing with the example of a compressor described above, the compressor may be used with a fan. The compressor setting may place minimum requirements on the fan. For example:

| Compressor Setting | Minimum Fan Setting |
|---|---|
| High | Medium |
| Medium | Low |

-continued

| Compressor Setting | Minimum Fan Setting |
|---|---|
| Low | Low |
| Off | n/a |

Thus, when the fan is considered, if the fan is at a medium setting and the compressor is at a high setting, a power curtailment action of reducing fan speed can only be implemented alongside a second power curtailment action of reducing compressor speed to medium, while turning the fan off entirely would also require turning the compressor off, or at least first confirming that the compressor setting does not affect the ability to reduce the fan setting in a power curtailment action.

The available actions 152 can be determined at least in part based on operator inputs during a configuration procedure, such as outlined in FIG. 4. Available actions may be considered as subsets to address combinational issues (actions that must or cannot be taken together, for example). For example, given two pieces of equipment whose performance is related in one way or another, there may be combinations of curtailment steps. In a tank system, for example, if a desired blend of materials in a particular tank results from operation of two or more pumps providing material into the tank, turning off one of the pumps, or reducing speed thereof, may also require taking action with the other pump.

History of any usage and/or curtailment is then scanned, as indicated at 154. Here, one or more previous instances of power curtailment are analyzed. Power curtailment actions that have previously been used in previous power curtailment actions are identified, and de-prioritized, blocked or disfavored, as indicated at 156. An action may be de-prioritized, blocked or disfavored 156 in several ways, as discussed above. For example, a penalty may be established and applied to a cost analysis in which various power curtailment actions are analyzed; this may be a de-prioritization and/or disfavoring step. Re-use may be entirely prevented or blocked within a specified time period or quantity of iterations of the power curtailment activity, in some examples. In some examples, reuse is blocked for a first period or quantity of iterations, and is then allowed thereafter but disfavored by, for example, applying a penalty in the cost analysis, if cost analysis is performed, for another period or quantity of iterations.

Action combinations that will provide the requested power curtailment, $P_{curt}$, as indicated at 160. Those actions that are found to provide the requested power curtailment, $P_{curt}$, are then implemented to reduce power use at the facility, as indicated at 164. Such implementation of actions, or execution of actions, to reduce or curtail power usage may be performed in several ways. For example, the processor, computer or controller that performs the steps shown at 164 may issue commands to power users in the facility to reduce power usage. A command may be, for example, to change a setting or operating parameter of a power user, and/or to turn off a power user. A command in some examples may also include activation of a power source on site, such as a gas-powered generator, opening a sluice for a hydro-powered source, or enabling a gravity-power storage system or battery to output power.

The history of power curtailment is then updated, as indicated at 166. Such history may be stored to help identify which actions have been implemented previously. History may also be used to compare actual reduction in power usage to that which would be expected from the execution of selected power curtailment actions.

If desired, an optimization step may also be performed as indicated at 162. Optimization may include, for example and without limitation, performing a cost analysis to find a best fitting, and lowest penalty or other cost solution. Here, the cost of taking any possible one or set of power curtailment actions is considered. This may include, for example and without limitation, consideration of life cost on equipment, operator preferences, prior usage, and any other suitable factors to optimize 162 to the selected solution. Consideration of over-curtailment may be included, as desired.

The entire process may iterate, as indicated at 168. As previously indicated, the power prediction routine is generally performed at intervals, such as 10 to 20 minute intervals, or longer, shorter, or any duration therebetween. When iteration occurs, the updated history from block 166 may be used to modify, for example, any of the stored data regarding previous power curtailment actions. Iteration may include updating other stored data, including, optionally, any model updates if desired. As described briefly above, models for individual equipment and/or an overall system model for the un-metered users in the facility may be updated by monitoring for changes in overall power consumption responsive to the changes made at block 164, as indicated at 170.

When the method is iterated, the state of the system, as well as any demanded or requested reduction in power, are re-calculated. In some examples, the undoing of any actions taken to curtail power reduction is not performed until an indication of excess power capacity is obtained from a repeat of the power prediction algorithm. That is, the changes made in a given iteration may be kept in place indefinitely, if desired. On the other hand, the state of the facility will be monitored over time, and as that state changes, it may be determined that re-arranging of the power curtailment actions is needed. For example, during daylight hours, turning off lighting is relatively simple and safe in areas that have ambient light. However, nightfall means some of the lighting needs to be reactivated, requiring reassessment. In another example, reducing use of the air conditioning system is a short term way of addressing power use. As temperatures in the facility rise, it may be necessary for various reasons (health and safety, as well as effects on equipment in the facility, potentially) to re-engage the air conditioning system. Such changes can be considered when iterating the analysis and method.

In other example, a synthesis of the system state may be performed at each iteration. Here, for example, a power prediction is performed by identifying the already implemented power curtailment actions, and estimating a total power that would be demanded in the facility if none of the power curtailment actions were in place. Then, a recalculation of the power curtailment may be performed, using updated history information (that is, after updating any available power curtailment actions, weights and penalties as may apply due to the previous iteration). This may result in changing the implemented power curtailment actions at each iteration. If desired, the operator, when entering preferences, and/or the system models, may include a field for hysteresis in which any power curtailment action, once taken, should be kept in place for at least a minimum duration. Such an approach may apply, for example, to equipment that requires relatively long lead time to be ready for use, such as a boiler. Once a boiler is turned off, turning it back on after 15 minutes may be highly inefficient; it may be preferable to keep the boiler off for several hours until no power curtailment actions are needed before returning the boiler to a desired setpoint temperature, for example.

Each of these non-limiting examples can stand on its own, or can be combined in various permutations or combinations with one or more of the other examples.

The above detailed description includes references to the accompanying drawings, which form a part of the detailed description. The drawings show, by way of illustration, specific embodiments. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls. In this document, the terms "a" or "an" are used, as is common in patent documents, to include one or more than one, independent of any other instances or usages of "at least one" or "one or more." Moreover, in the claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic or optical disks, magnetic cassettes, memory cards or sticks, random access memories (RAMs), read only memories (ROMs), and the like.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims.

Also, in the above Detailed Description, various features may be grouped together to streamline the disclosure. This should not be interpreted as intending that an unclaimed disclosed feature is essential to any claim. Rather, innovative subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the protection should be determined with reference to the appended claims, along with the full scope of equivalents to which such claims are entitled.

What is claimed is:

1. A method for managing power usage in a facility comprising:

constructing, from equipment product specifications, a plurality of models each associated with a power user in the facility, each model of the plurality of models defining power usage at multiple device settings;

using at least the plurality of models, defining a plurality of power curtailment actions and estimated power reduction for each power curtailment action;

presenting to an operator the plurality of power curtailment actions and estimated power reduction for each power curtailment action;

receiving, from the operator, a selection of the plurality of power curtailment actions for use in peak power management;

determining a power reduction is needed in the facility;

identifying a subset of the selected power curtailment actions to execute to achieve the power reduction by:

determining prior usage of the selected power curtailment actions and de-prioritizing use of at least one of the selected power curtailment actions based on the prior usage, including at least one of: (i) preventing reuse for at least a pre-defined duration; (ii) applying a time-decayed penalty to reuse; wherein each model is constructed using the equipment product specifications to estimate the power usage at the multiple device settings of the power user;

determining quantity of power reduction needed; and automatically identifying a combination of the power curtailment actions which, based on the estimated power reduction for each power curtailment action, will provide the needed quantity of power reduction, wherein the identification of the combination of the power curtailment actions comprises:

enforcing action-combination constraints including at least mutual-exclusivity and required-pairing rules derived from equipment operating constraints; and applying a cost function to identify a least cost subset of curtailment actions providing the quantity of power reduction, wherein valid combinations of the power curtailment actions are limited such that an amount of over-curtailment in the identified subset remains within an estimated power reduction corresponding to at least one curtailment action in the subset, and wherein the combination of the power curtailment actions is predicted to be applied for at least a pre-defined duration based on future power consumption estimation; and executing the subset of the selected power curtailment actions to reduce power used in the facility.

2. The method of claim 1, wherein de-prioritizing includes preventing use of the at least one of the selected power curtailment actions.

3. The method of claim 1, wherein de-prioritizing comprises applying an additional cost on use of the at least one of the selected power curtailment actions based on the prior usage.

4. The method of claim 1, wherein receiving, from the operator, the selection of the power curtailment actions for use in peak power management also includes receiving one or more indications of costs to associate with the selection of the power curtailment actions.

5. The method of claim 1, wherein the step of determining a power reduction is needed in the facility comprises applying one of the plurality of models to estimate the future power consumption at least one of the modeled power users.

6. The method of claim 1, further comprising measuring power usage by at least one power equipment system in the facility using a power meter associated with the at least one power equipment system, identifying a power equipment curtailment action associated with the at least one power equipment system, and including the power equipment curtailment action in the selected power curtailment actions.

7. The method of claim 1, wherein determining prior usage of the selected power curtailment actions comprises identifying a previous episode of execution of one or more power curtailment actions, and de-prioritizing is applied to all power curtailment actions used in the previous episode.

8. The method of claim 1, wherein de-prioritizing comprises applying a weighting or cost factor to a de-prioritized power curtailment action.

9. The method of claim 8, wherein the weighting or cost factor applied to the de-prioritized power curtailment action being a function of time which reduces effect of the weighting or cost factor as time passes since a last use of the de-prioritized power curtailment action.

10. A non-transitory, computer-readable medium including instructions that when executed by a processor cause the processor to:

construct, from equipment product specifications, a plurality of models each associated with a power user in a facility, each model of the plurality of models defining power usage at multiple device settings;

using at least the plurality of models, define a plurality of power curtailment actions and estimated power reduction for each power curtailment action;

present to an operator, on a graphical interface, the plurality of power curtailment actions and estimated power reduction for each power curtailment action;

receive, from the operator at an operator interface, a selection of the plurality of power curtailment actions for use in peak power management;

determine a power reduction is needed in the facility;

identify a subset of the selected power curtailment actions to execute to achieve the power reduction by:

determining prior usage of the selected power curtailment actions and de-prioritizing use of at least one of the selected power curtailment actions based on the prior usage, including at least one of: (i) preventing reuse for at least a pre-defined duration; (ii) applying a time-decayed penalty to reuse; wherein each model is constructed using the equipment product specifications to estimate the power usage at the multiple device settings of the power user;

determining quantity of power reduction needed; and automatically identifying a combination of the power curtailment actions which, based on the estimated power reduction for each power curtailment action, will provide the needed quantity of power reduction, wherein the identification of the combination of the power curtailment actions comprises:

enforcing action-combination constraints including at least mutual-exclusivity and required-pairing rules derived from equipment operating constraints; and applying a cost function to identify a least cost subset of curtailment actions providing the quantity of power reduction, wherein valid combinations of the power curtailment actions are limited such that an amount of over-curtailment in the identified subset remains within an estimated power reduction corresponding to at least one curtailment action in the subset, and wherein the combination of the power curtailment actions is predicted to be applied for at least a pre-defined duration based on future power consumption estimation; and issue commands to execute the subset of the selected power curtailment actions to reduce power used in the facility.

11. The medium of claim 10, wherein de-prioritizing includes preventing use of the at least one of the selected power curtailment actions.

12. The medium of claim 10, wherein de-prioritizing comprises applying an additional cost on use of the at least one of the selected power curtailment actions based on the prior usage.

13. The medium of claim 10, wherein receiving, from the operator, the selection of the power curtailment actions for use in peak power management also includes receiving one or more indications of costs to associate with the selection of the power curtailment actions.

14. The medium of claim 10, wherein the instructions cause the processor to determine the power reduction is needed in the facility by applying one of the plurality of models to estimate the future power consumption at least one of the modeled power users.

15. The medium of claim 10, wherein the instructions also cause the processor to measure power usage by at least one power equipment system in the facility using a power meter associated with the at least one power equipment system, identify a power equipment curtailment action associated with the at least one power equipment system, and include the power equipment curtailment action in the selected power curtailment actions.

16. The medium of claim 10, wherein determining prior usage of the selected power curtailment actions comprises identifying a previous episode of execution of one or more power curtailment actions, and de-prioritizing is applied to all power curtailment actions used in the previous episode.

17. The medium of claim 10, wherein de-prioritizing comprises applying a weighting or cost factor to a de-prioritized power curtailment action.

18. A system comprising a processor in a facility, a graphical interface associated with the processor, and an operator interface associated with the processor, the processor coupled to one or more communications lines or devices in the facility to provide commands to and obtain data from one or more power users in the facility, wherein the processor is configured to:

construct, from equipment product specifications, a plurality of models each associated with a power user in a facility, each model of the plurality of models defining power usage at multiple device settings;

using at least the plurality of models, define a plurality of power curtailment actions and estimated power reduction for each power curtailment action;

present to an operator, on a graphical interface, the plurality of power curtailment actions and estimated power reduction for each power curtailment action;

receive, from the operator at an operator interface, a selection of the plurality of power curtailment actions for use in peak power management;

determine a power reduction is needed in the facility;

identify a subset of the selected power curtailment actions to execute to achieve the power reduction by:

determining prior usage of the selected power curtailment actions and de-prioritizing use of at least one of the selected power curtailment actions based on the prior usage, including at least one of: (i) preventing reuse for at least a pre-defined duration; (ii) applying a time-decayed penalty to reuse; wherein each model is constructed using the equipment product specifications to estimate the power usage at the multiple device settings of the power user;

determining quantity of power reduction needed; and automatically identifying a combination of the power curtailment actions which, based on the estimated power reduction for each power curtailment action, will provide the needed quantity of power reduction, wherein the identification of the combination of the power curtailment actions comprises;

enforcing action-combination constraints including at least mutual-exclusivity and required-pairing rules derived from equipment operating constraints; and applying a cost function to identify a least cost subset of curtailment actions providing the quantity of power reduction, wherein valid combinations of the power curtailment actions are limited such that an amount of over-curtailment in the identified subset remains within an estimated power reduction corresponding to at least one curtailment action in the subset, and wherein the combination of the power curtailment actions is predicted to be applied for at least a pre-defined duration based on future power consumption estimation; and issue commands to execute the subset of the selected power curtailment actions to reduce power used in the facility.

* * * * *